(12) United States Patent
Retek et al.

(10) Patent No.: US 12,353,840 B2
(45) Date of Patent: Jul. 8, 2025

(54) COMPUTER VISION BASED SIGN LANGUAGE INTERPRETER

(71) Applicant: Snap Inc., Santa Monica, CA (US)

(72) Inventors: Dávid Retek, Dunaújváros (HU); Dávid Pálházi, Tata (HU); Márton Kajtar, Felsopakony (HU); Attila Alvarez, Budapest (HU); Péter Pócsi, Budapest (HU); András Németh, Budapest (HU); Mátyás Trosztel, Budapest (HU); Zsolt Robotka, Budapest (HU); János Rovnyai, Leányfalu (HU)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/501,349

(22) Filed: Nov. 3, 2023

(65) Prior Publication Data

US 2024/0070405 A1 Feb. 29, 2024

Related U.S. Application Data

(63) Continuation of application No. 16/762,302, filed as application No. PCT/US2018/059861 on Nov. 8, 2018, now Pat. No. 11,847,426.

(Continued)

(51) Int. Cl.
*G06F 40/58* (2020.01)
*G06F 3/01* (2006.01)
(Continued)

(52) U.S. Cl.
CPC .............. *G06F 40/58* (2020.01); *G06F 3/014* (2013.01); *G06F 3/017* (2013.01); *G06F 40/205* (2020.01); *G06V 40/28* (2022.01)

(58) Field of Classification Search
CPC .......... G06F 40/58; G06F 3/014; G06F 3/017; G06F 40/205; G06F 3/0304; G06V 40/28; G09B 21/009
(Continued)

(56) References Cited

U.S. PATENT DOCUMENTS 6,323,846 B1 * 11/2001 Westerman ........... G06F 3/0235
345/173
7,565,295 B1 * 7/2009 Hernandez-Rebollar ....................
G09B 21/009
704/271
(Continued)

FOREIGN PATENT DOCUMENTS

CN 103049761 B 8/2016
EP 3707693 A1 9/2020
(Continued)

OTHER PUBLICATIONS

P. C. Badhe and V. Kulkarni, "Indian sign language translator using gesture recognition algorithm," 2015 IEEE International Conference on Computer Graphics, Vision and Information Security (CGVIS), Bhubaneswar, India, 2015, pp. 195-200, doi: 10.1109/CGVIS.2015.7449921. (Year: 2015).*
(Continued)

*Primary Examiner* — Thuykhanh Le
(74) *Attorney, Agent, or Firm* — Schwegman Lundberg & Woessner, P.A.

(57) ABSTRACT

A system and method for translating sign language utterances into a target language, including: receiving motion capture data; producing phonemes/sign fragments from the received motion capture data; producing a plurality of sign sequences from the phonemes/sign fragments; parsing these sign sequences to produce grammatically parsed sign utterances; translating the grammatically parsed sign utterances into grammatical representations in the target language; and
(Continued)

generating output utterances in the target language based upon the grammatical representations.

20 Claims, 5 Drawing Sheets

Related U.S. Application Data

(60) Provisional application No. 62/583,026, filed on Nov. 8, 2017.

(51) Int. Cl.
*G06F 40/205* (2020.01)
*G06V 40/20* (2022.01)

(58) Field of Classification Search
USPC .......................................................... 704/2
See application file for complete search history.

(56) References Cited

U.S. PATENT DOCUMENTS

| | | |
|---|---|---|
| 7,971,156 B2 | 6/2011 | Albertson et al. |
| 7,996,793 B2 | 8/2011 | Latta et al. |
| 8,311,973 B1 * | 11/2012 | Zadeh ...................... G06T 7/12 |
| | | 706/903 |
| 8,487,938 B2 | 7/2013 | Latta et al. |
| 8,751,215 B2 * | 6/2014 | Tardif ..................... G06F 3/017 |
| | | 704/4 |
| 8,755,568 B2 * | 6/2014 | Adhikari ............ G06F 18/2411 |
| | | 382/218 |
| 8,856,691 B2 | 10/2014 | Geisner et al. |
| 9,225,897 B1 | 12/2015 | Sehn et al. |
| 9,230,160 B1 * | 1/2016 | Kanter .................... G06V 40/28 |
| 9,276,886 B1 | 3/2016 | Samaranayake |
| 9,705,831 B2 | 7/2017 | Spiegel |
| 9,742,713 B2 | 8/2017 | Spiegel et al. |
| 10,102,423 B2 | 10/2018 | Shaburov et al. |
| 10,176,366 B1 * | 1/2019 | Maxwell ................ G06V 40/20 |
| 10,209,881 B2 * | 2/2019 | Cherradi El Fadili . G06F 3/041 |
| 10,284,508 B1 | 5/2019 | Allen et al. |
| 10,439,972 B1 | 10/2019 | Spiegel et al. |
| 10,460,159 B1 * | 10/2019 | Shields ................. G06V 40/113 |
| 10,509,466 B1 | 12/2019 | Miller et al. |
| 10,514,876 B2 | 12/2019 | Sehn |
| 10,579,869 B1 | 3/2020 | Xiong et al. |
| 10,591,730 B2 | 3/2020 | Rodriguez, II et al. |
| 10,614,855 B2 | 4/2020 | Huang |
| 10,748,347 B1 | 8/2020 | Li et al. |
| 10,958,608 B1 | 3/2021 | Allen et al. |
| 10,962,809 B1 | 3/2021 | Castañeda |
| 10,996,846 B2 | 5/2021 | Robertson et al. |
| 10,997,787 B2 | 5/2021 | Ge et al. |
| 11,012,390 B1 | 5/2021 | Al Majid et al. |
| 11,030,454 B1 | 6/2021 | Xiong et al. |
| 11,036,368 B1 | 6/2021 | Al Majid et al. |
| 11,062,498 B1 | 7/2021 | Voss et al. |
| 11,087,728 B1 | 8/2021 | Canberk et al. |
| 11,092,998 B1 | 8/2021 | Castañeda et al. |
| 11,106,342 B1 | 8/2021 | Al Majid et al. |
| 11,126,206 B2 | 9/2021 | Meisenholder et al. |
| 11,143,867 B2 | 10/2021 | Rodriguez, II |
| 11,169,600 B1 | 11/2021 | Canberk et al. |
| 11,227,626 B1 | 1/2022 | Krishnan Gorumkonda et al. |
| 11,307,747 B2 | 4/2022 | Dancie et al. |
| 11,531,402 B1 | 12/2022 | Stolzenberg |
| 11,546,505 B2 | 1/2023 | Canberk |
| 2005/0238201 A1 * | 10/2005 | Shamaie ................ G06V 40/20 |
| | | 382/103 |
| 2006/0087510 A1 * | 4/2006 | Adamo-Villani ....... G06T 19/20 |
| | | 345/474 |
| 2006/0092178 A1 * | 5/2006 | Tanguay ................ H04N 7/147 |
| | | 348/E7.081 |
| 2008/0036737 A1 * | 2/2008 | Hernandez-Rebollar .................... |
| | | G06F 1/163 |
| | | 345/158 |
| 2009/0012788 A1 | 1/2009 | Gilbert et al. |
| 2009/0110292 A1 * | 4/2009 | Fujimura ................ G06F 3/017 |
| | | 382/203 |
| 2010/0023314 A1 * | 1/2010 | Hernandez-Rebollar .................... |
| | | G10L 13/00 |
| | | 704/E13.001 |
| 2010/0145729 A1 * | 6/2010 | Katz ................. G06Q 10/06315 |
| | | 434/362 |
| 2011/0157472 A1 * | 6/2011 | Keskinen ............. G09B 21/009 |
| | | 348/E3.001 |
| 2011/0234384 A1 * | 9/2011 | Agrawal .................. H04Q 9/00 |
| | | 340/10.5 |
| 2011/0301934 A1 * | 12/2011 | Tardif ..................... G06F 40/45 |
| | | 382/103 |
| 2012/0317521 A1 | 12/2012 | Ludwig |
| 2013/0294651 A1 * | 11/2013 | Zhou ....................... G06V 40/28 |
| | | 382/103 |
| 2013/0295529 A1 | 11/2013 | Shin et al. |
| 2013/0335318 A1 * | 12/2013 | Nagel ..................... G06F 3/012 |
| | | 345/156 |
| 2014/0016859 A1 * | 1/2014 | Karam ................. G06V 10/462 |
| | | 382/201 |
| 2014/0171036 A1 | 6/2014 | Simmons |
| 2014/0201126 A1 * | 7/2014 | Zadeh ..................... A61B 5/165 |
| | | 706/52 |
| 2014/0253429 A1 * | 9/2014 | Dai ........................... G06T 7/11 |
| | | 345/156 |
| 2014/0347263 A1 * | 11/2014 | Dai ....................... G06F 3/0482 |
| | | 345/156 |
| 2015/0084859 A1 * | 3/2015 | Itzhaik ................... G06F 3/017 |
| | | 382/103 |
| 2015/0120293 A1 * | 4/2015 | Wohlert .................. G10L 21/10 |
| | | 704/235 |
| 2015/0309316 A1 * | 10/2015 | Osterhout ........... G06F 3/03547 |
| | | 345/8 |
| 2015/0370320 A1 * | 12/2015 | Connor ................ A61B 5/1121 |
| | | 345/173 |
| 2016/0004905 A1 * | 1/2016 | Lucey ..................... G06T 13/40 |
| | | 382/118 |
| 2016/0307469 A1 * | 10/2016 | Zhou ..................... G09B 21/009 |
| 2016/0364009 A1 * | 12/2016 | Lemberger .......... H04N 21/4424 |
| 2017/0123487 A1 * | 5/2017 | Hazra .................... G06F 3/0482 |
| 2017/0220120 A1 * | 8/2017 | Westbrook ............ G06F 18/295 |
| 2017/0263154 A1 * | 9/2017 | Wang .................... G09B 21/009 |
| 2017/0277684 A1 * | 9/2017 | Dharmarajan Mary .................... |
| | | G10L 13/00 |
| 2017/0277685 A1 | 9/2017 | Takumi |
| 2017/0351910 A1 | 12/2017 | Elwazer et al. |
| 2018/0075659 A1 * | 3/2018 | Browy ................ G02B 27/0172 |
| 2018/0101520 A1 * | 4/2018 | Fuchizaki ............... G06F 40/40 |
| 2018/0158370 A1 | 6/2018 | Pryor |
| 2018/0196502 A1 * | 7/2018 | Smith .................. G06F 3/04815 |
| 2018/0348877 A1 * | 12/2018 | Chan ...................... H04R 1/028 |
| 2018/0374483 A1 * | 12/2018 | Florexil .................. G06F 40/58 |
| 2019/0092169 A1 * | 3/2019 | Thurimella ............. G06F 3/011 |
| 2019/0138607 A1 * | 5/2019 | Zhang .................... G06N 3/044 |
| 2019/0146219 A1 | 5/2019 | Rodriguez, II |
| 2019/0204931 A1 * | 7/2019 | Groh ......................... G06T 7/70 |
| 2019/0311651 A1 * | 10/2019 | Marascio ................ G10L 13/00 |
| 2020/0074886 A1 * | 3/2020 | Robinson ................ G09B 5/02 |
| 2021/0011612 A1 | 1/2021 | Dancie et al. |
| 2021/0074016 A1 | 3/2021 | Li et al. |
| 2021/0166732 A1 | 6/2021 | Shaburova et al. |
| 2021/0174034 A1 | 6/2021 | Retek et al. |
| 2021/0241529 A1 | 8/2021 | Cowburn et al. |
| 2021/0303075 A1 | 9/2021 | Cowburn et al. |
| 2021/0303077 A1 | 9/2021 | Anvaripour et al. |
| 2021/0303140 A1 | 9/2021 | Mourkogiannis |
| 2021/0382564 A1 | 12/2021 | Blachly et al. |
| 2021/0397000 A1 | 12/2021 | Rodriguez, II |
| 2021/0405761 A1 | 12/2021 | Canberk |
| 2022/0188539 A1 | 6/2022 | Chan et al. |
| 2022/0206588 A1 | 6/2022 | Canberk et al. |
| 2022/0300730 A1 | 9/2022 | Eirinberg et al. |

(56) References Cited

U.S. PATENT DOCUMENTS

| | | |
|---|---|---|
| 2022/0300731 A1 | 9/2022 | Eirinberg et al. |
| 2022/0301231 A1 | 9/2022 | Eirinberg et al. |
| 2022/0326781 A1 | 10/2022 | Hwang et al. |
| 2022/0334649 A1 | 10/2022 | Hwang et al. |
| 2022/0375174 A1 | 11/2022 | Arya et al. |

FOREIGN PATENT DOCUMENTS

| | | |
|---|---|---|
| EP | 4172726 A1 | 5/2023 |
| EP | 4172730 A1 | 5/2023 |
| KR | 20220158824 A | 12/2022 |
| WO | WO-2016168591 A1 | 10/2016 |
| WO | WO-2019094618 A1 | 5/2019 |
| WO | WO-2022005687 A1 | 1/2022 |
| WO | WO-2022005693 A1 | 1/2022 |
| WO | WO-2022060549 A2 | 3/2022 |
| WO | WO-2022066578 A1 | 3/2022 |
| WO | WO-2022060549 A3 | 4/2022 |
| WO | WO-2022132381 A1 | 6/2022 |
| WO | WO-2022146678 A1 | 7/2022 |
| WO | WO-2022198182 A1 | 9/2022 |
| WO | WO-2022216784 A1 | 10/2022 |
| WO | WO-2022225761 A1 | 10/2022 |
| WO | WO-2022245765 A1 | 11/2022 |

OTHER PUBLICATIONS

"U.S. Appl. No. 16/762,302, Corrected Notice of Allowability mailed Sep. 12, 2023", 2 pgs.

"U.S. Appl. No. 16/762,302, Examiner Interview Summary mailed Jun. 10, 2022", 3 pgs.

"U.S. Appl. No. 16/762,302, Final Office Action mailed Oct. 14, 2022", 25 pgs.

"U.S. Appl. No. 16/762,302, Non Final Office Action mailed Feb. 15, 2023", 26 pgs.

"U.S. Appl. No. 16/762,302, Non Final Office Action mailed Mar. 2, 2022", 28 pgs.

"U.S. Appl. No. 16/762,302, Notice of Allowance mailed Aug. 3, 2023", 16 pgs.

"U.S. Appl. No. 16/762,302, Preliminary Amendment filed May 7, 2020", 11 pgs.

"U.S. Appl. No. 16/762,302, Response filed Jan. 17, 2023 to Final Office Action mailed Oct. 14, 2022", 12 pgs.

"U.S. Appl. No. 16/762,302, Response filed Jun. 15, 2023 to Non Final Office Action mailed Feb. 15, 2023", 12 pgs.

"U.S. Appl. No. 16/762,302, Response filed Jul. 5, 2022 to Non Final Office Action mailed Mar. 2, 2022", 11 pgs.

"European Application Serial No. 18811686.7, Communication Pursuant to Article 94(3) EPC mailed May 31, 2023", 7 pgs.

"European Application Serial No. 18811686.7, Communication Pursuant to Article 94(3) EPC mailed Dec. 8, 2021", 6 pgs.

"European Application Serial No. 18811686.7, Indication of deficiencies in a request under Rule 22 EPC mailed May 8, 2023", 2 pgs.

"European Application Serial No. 18811686.7, Response filed Apr. 8, 2022 to Communication Pursuant to Article 94(3) EPC mailed Dec. 8, 2021", 17 pgs.

"International Application Serial No. PCT/US2018/059861, International Preliminary Report on Patentability mailed May 22, 2020", 8 pgs.

"International Application Serial No. PCT/US2018/059861, International Search Report mailed Feb. 5, 2019", 4 pgs.

"International Application Serial No. PCT/US2018/059861, Written Opinion mailed Feb. 5, 2019", 6 pgs.

Dorner, Brigitte, "Towards an American Sign Language Interface", Integration of Natural Language and Vision Processing Computational Models and Systems, Springer, XP009173827, (Jan. 1, 1995), 143-161.

\* cited by examiner

COMPUTER VISION BASED SIGN LANGUAGE INTERPRETER

CLAIM FOR PRIORITY

This application is a continuation of and claims the benefit of priority of U.S. application Ser. No. 16/762,302, filed May 7, 2020, which is a U.S. National Stage Filing under 35 U.S.C. § 371 from International Application No. PCT/US2018/059861, filed on Nov. 8, 2018, and published as WO2019/094618 on May 16, 2019, which claims the benefit of priority to U.S. Provisional Application No. 62/583,026, filed on Nov. 8, 2017; the benefit of priority of each of which is hereby claimed herein, and which applications and publication are hereby incorporated herein by reference in their entireties.

TECHNICAL FIELD

Various exemplary embodiments disclosed herein relate generally to computer based two-way translation between a sign language user and a spoken or written or another sign language user.

BACKGROUND

Technology exists that can capture signs performed by a sign language user using optical and other sensors (e.g., cameras, 3D sensors, etc.). Each utterance of signing may be translated into a target language which can then be generated into a desired form (e.g., text, sound, or visualized via avatar, etc.).

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a method of translating sign language utterances into a target language, including: receiving motion capture data; producing phonemes/sign fragments from the received motion capture data; producing a plurality of sign sequences from the phonemes/sign fragments; parsing these sign sequences to produce grammatically parsed sign utterances; translating the grammatically parsed sign utterances into grammatical representations in the target language; and generating output utterances in the target language based upon the grammatical representations.

Various embodiments are described, wherein confidence values are produced for each generated output utterance.

Various embodiments are described, wherein producing phonemes/sign fragments from motion capture data includes producing a confidence value for each produced phoneme/sign fragment.

Various embodiments are described, wherein producing phonemes/sign fragments includes producing a plurality of segments as time intervals matching the phonemes/sign fragments, where these intervals of the segments may overlap.

Various embodiments are described, wherein producing phonemes/sign fragments and their intervals includes determining of a set of possible succeeding phoneme/sign fragment for each phoneme/sign fragment.

Various embodiments are described, wherein producing sign sequences from the phonemes/sign fragments includes matching potential paths in a graph of phonemes/sign fragments to each sign in each sign sequence.

Various embodiments are described, wherein producing grammatically parsed sign utterances includes producing a grammatical context and using the grammatical context of previous utterances.

Various embodiments are described, wherein producing grammatically parsed sign utterances includes producing a confidence value based on the confidences of the signs, the confidence of the parsing and confidence of the parse matching a grammatical context for each parse of each sign sequence.

Various embodiments are described, further including: generating a plurality of output utterances in the target language based upon the plurality of sign sequences; displaying the plurality output utterances to a user; and receiving an indication from the user selecting one of the plurality of displayed output utterances as the correct translation.

Various embodiments are described, further including detecting the end of a sign language utterance before parsing the sign sequence to produce a grammatically parsed sign utterance.

Various embodiments are described, wherein producing phonemes/sign fragments from the extracted features further includes extracting features from the motion capture data.

Various embodiments are described, wherein the motion capture data includes data captured using marked gloves used by a user to produce the sign language utterance Various embodiments are described, wherein user specific parameter data is used for one of: producing phonemes/sign fragments; producing a plurality of sign sequences;

parsing these sign sequences; and translating the grammatically parsed sign utterances.

Various embodiments are described, further including: detecting that the user is using fingerspelling, after producing phonemes/sign fragments; translating the fingerspelling phoneme/sign fragments to letters in the target language; generating an output to the user showing translated letters to the user; and receiving an input from the user indicating the correctness of the translated letters.

Further various embodiments relate to a system configured to translate sign language utterances into a target language, including: an input interface configured to receive motion capture data; a memory; and a processor in communication with the input interface and the memory, the processor being configured to: produce phonemes/sign fragments from the extracted features; produce a sign sequence from the phonemes/sign fragments; parse the sign sequence to produce a grammatically parsed sign utterance; translate the grammatically parsed sign utterance into a grammatical representation in the target language; and generate an output utterance in the target language based upon the grammatical representation.

Various embodiments are described, wherein confidence values are produced for each generated output utterance.

Various embodiments are described, wherein producing phonemes/sign fragments from motion capture data includes producing a confidence value for each produced phoneme/sign fragment.

Various embodiments are described, wherein producing phonemes/sign fragments includes producing a plurality of segments as time intervals matching the phonemes/sign fragments, where these intervals of the segments may overlap.

Various embodiments are described, wherein producing phonemes/sign fragments and their intervals includes determining of a set of possible succeeding phoneme/sign fragment for each phoneme/sign fragment.

Various embodiments are described, wherein producing sign sequences from the phonemes/sign fragments includes matching potential paths in a graph of phonemes/sign fragments to each sign in each sign sequence.

Various embodiments are described, wherein producing grammatically parsed sign utterances includes producing a grammatical context and using the grammatical context of previous utterances.

Various embodiments are described, wherein producing grammatically parsed sign utterances includes producing a confidence value based on the confidences of the signs, the confidence of the parsing and confidence of the parse matching a grammatical context for each parse of each sign sequence.

Various embodiments are described, wherein the processor is further configured to: generate a plurality of output utterances in the target language based upon the plurality of sign sequences; display the plurality output utterances to a user; and receive an indication from the user selecting one of the plurality of displayed output utterances as the correct translation.

Various embodiments are described, wherein the processor is further configured to detect the end of a sign language utterance before parsing the sign sequence to produce a grammatically parsed sign utterance.

Various embodiments are described, wherein producing phonemes/sign fragments from the extracted features further includes extracting features from the motion capture data.

Various embodiments are described, wherein the motion capture data includes data captured using marked gloves used by a user to produce the sign language utterance Various embodiments are described, wherein user specific parameter data is used for one of: producing phonemes/sign fragments; producing a plurality of sign sequences; parsing these sign sequences; and translating the grammatically parsed sign utterances.

Various embodiments are described, wherein the processor is further configured to: detect that the user is using fingerspelling, after producing phonemes/sign fragments; translate the fingerspelling phoneme/sign fragments to letters in the target language; generate an output to the user showing translated letters to the user; and receive an input from the user indicating the correctness of the translated letters.

Various embodiments are described, further including sensors producing motion capture data.

Various embodiments are described, further including marked gloves used by a user to produce the sign language utterance.

Various embodiments are described, wherein the input interface further receives communication input from a second user to facilitate a conversation between the user and the second user.

Further various embodiments relate to a non-transitory machine-readable storage medium encoded with instructions for translating sign language utterances into a target language, including: instructions for receiving motion capture data; instructions for producing phonemes/sign fragments from the extracted features; instructions for producing a sign sequence from the phonemes/sign fragments; instructions for parsing the sign sequence to produce a grammatically parsed sign utterance; instructions for translating the grammatically parsed sign utterance into a grammatical representation in the target language; and instructions for generating an output utterance in the target language based upon the grammatical representation.

Various embodiments are described, wherein confidence values are produced for each generated output utterance.

Various embodiments are described, wherein producing phonemes/sign fragments from motion capture data includes producing a confidence value for each produced phoneme/sign fragment.

Various embodiments are described, wherein producing phonemes/sign fragments includes producing a plurality of segments as time intervals matching the phonemes/sign fragments, where these intervals of the segments may overlap.

Various embodiments are described, wherein producing phonemes/sign fragments and their intervals includes determining of a set of possible succeeding phoneme/sign fragment for each phoneme/sign fragment.

Various embodiments are described, wherein producing sign sequences from the phonemes/sign fragments includes matching potential paths in a graph of phonemes/sign fragments to each sign in each sign sequence.

Various embodiments are described, wherein producing grammatically parsed sign utterances includes producing a grammatical context and using the grammatical context of previous utterances.

Various embodiments are described, wherein producing grammatically parsed sign utterances includes producing a confidence value based on the confidences of the signs, the confidence of the parsing and confidence of the parse matching a grammatical context for each parse of each sign sequence.

Various embodiments are described, further including: instructions for generating a plurality of output utterances in the target language based upon the plurality of sign sequences; instructions for displaying the plurality output utterances to a user; and instructions for receiving an indication from the user selecting one of the plurality of displayed output utterances as the correct translation.

Various embodiments are described, further including detecting the end of a sign language utterance before parsing the sign sequence to produce a grammatically parsed sign utterance.

Various embodiments are described, wherein producing phonemes/sign fragments from the extracted features further includes extracting features from the motion capture data.

Various embodiments are described, wherein the motion capture data includes data captured using marked gloves used by a user to produce the sign language utterance Various embodiments are described, wherein user specific parameter data is used for one of: producing phonemes/sign fragments; producing a plurality of sign sequences; parsing these sign sequences; and translating the grammatically parsed sign utterances.

Various embodiments are described, further including: instructions for detecting that the user is using fingerspelling, after producing phonemes/sign fragments; instructions for translating the fingerspelling phoneme/sign fragments to letters in the target language; instructions for generating an output to the user showing translated letters to the user; and instructions for receiving an input from the user indicating the correctness of the translated letters.

BRIEF DESCRIPTION OF THE DRAWINGS

In order to better understand various embodiments, reference is made to the accompanying drawings, wherein.

To facilitate understanding, identical reference numerals have been used to designate elements having substantially the same or similar structure and/or substantially the same or similar function.

DETAILED DESCRIPTION OF EMBODIMENTS

Figure 1:
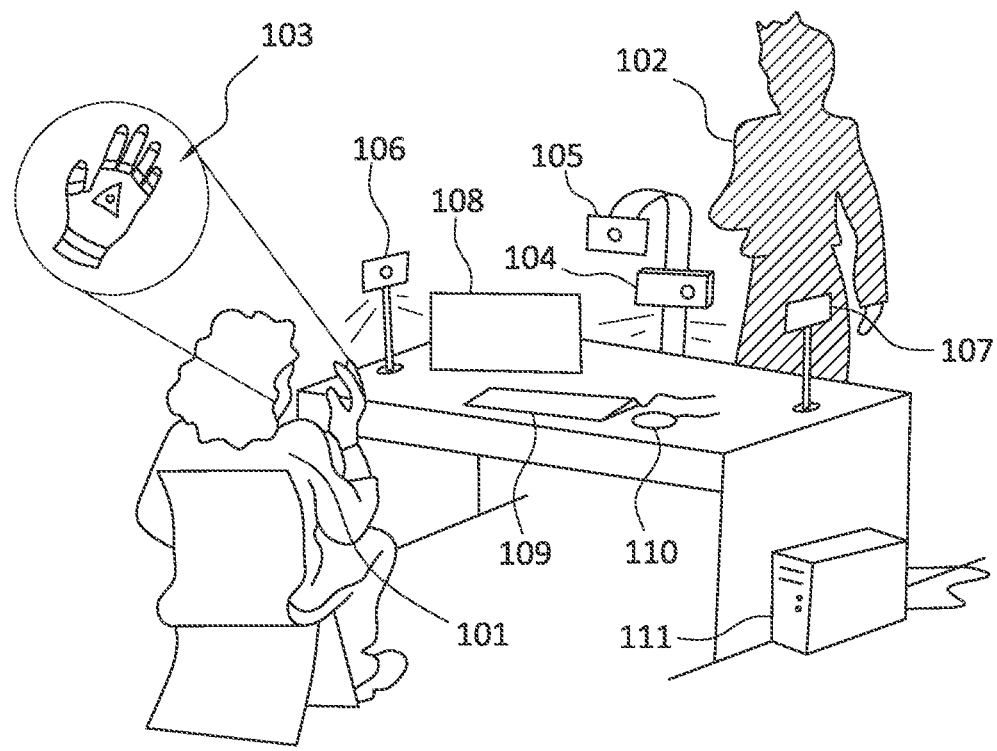
FIG. 1 illustrates an exemplary use of an embodiment in an interpretation situation.

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Embodiments of a method and system for detecting sign language signs performed by a person and translating the detected signs into a target language. The embodiments include a validation process for resolving possible ambiguities. A framework for integrating the translation of utterances into a two-way communication is also described including the appropriate parts of the opposite direction of the communication—from written or spoken or another sign language to the first sign language.

The embodiments described herein are founded on the general thought that high quality computer-based translation of sign language (or any other language) may only be may be achieved, if the conversation as a whole is grasped, and all relevant aspects are taken into consideration. This means that even in case of a real-time translation, one should understand how a natural observer is intended to understand the conversation. Only that level of understanding may lead to an accurate translation. For sign languages, the space used by the signer (signing space) and the whole situation should be examined. Temporal aspects also require careful analysis. Any phrase or expression uttered may only be recognized and translated after it is finished, and the boundaries between utterances are often ambiguous and may only be resolved by the grammatical and semantic context of the conversation. When omitting these aspects, only mechanical sign-by-sign translation may be achieved at best. Sign languages are different from spoken/written languages (even used in the same region as ASL—American Sign Language and English), translation may suffer from the grammatical differences.

Thus, the embodiments described herein incorporate the real structure of a sign language utterance into the processing and translation, in order to make real valid translation possible.

The embodiments described herein use, for example, the source sign language is ASL (American Sign Language), and the target language is either spoken or written English or another sign language. The embodiments described herein are independent of the languages specified. Grammatical differences may be implemented in the parser and generator components of the respective parts of the solution. As a result, the embodiments described herein may be used for any sign language and any spoken/written language.

FIG. 1 illustrates an exemplary use of an embodiment in an interpretation situation. The sign language user 101 signs in front of the cameras and 3D sensors 104, 105, 106, and 107. The other party 102 of the conversation may be present (on site interpreting), or may not be present (accessing the system remotely). The other party 102 may not be human—for example, in this case the system may act as an information kiosk. The sign language user 101 interacts with the system via the display 108, and optionally other interface devices, like a keyboard 109 and mouse 110. The underlying processing hardware 111 may be used for other general purposes in parallel to hosting the translator system and may be any type of computing platform or device.

An alternate simpler embodiment (not shown) may include a single device incorporating the sensor(s), display, user inputs, processing, etc. (for example, a table computer or mobile phone). The user communicates with the other party of the conversation who may be present (on site interpreting) or may not be present (accessing the system remotely). The other party may not be human—in this case the system may act as, or provide interface to an information kiosk or smart home, or any system with AI supported knowledge for interaction and dialogue for the user. The other party may be a limited interface, and the communication may be one-directed, e.g., analogue to voice activation (activation by sign or gesture). An embodiment may provide commands based on fingerspelled input or simple signs to a smart TV or other devices.

Figure 2:
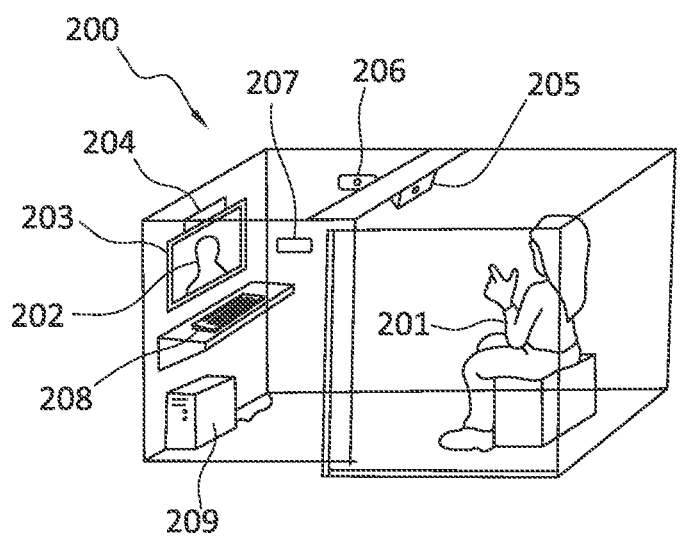
FIG. 2 illustrates an exemplary use of an embodiment in a booth configuration optimized for remote interpretation and/or confidential situations.
Figure 3:
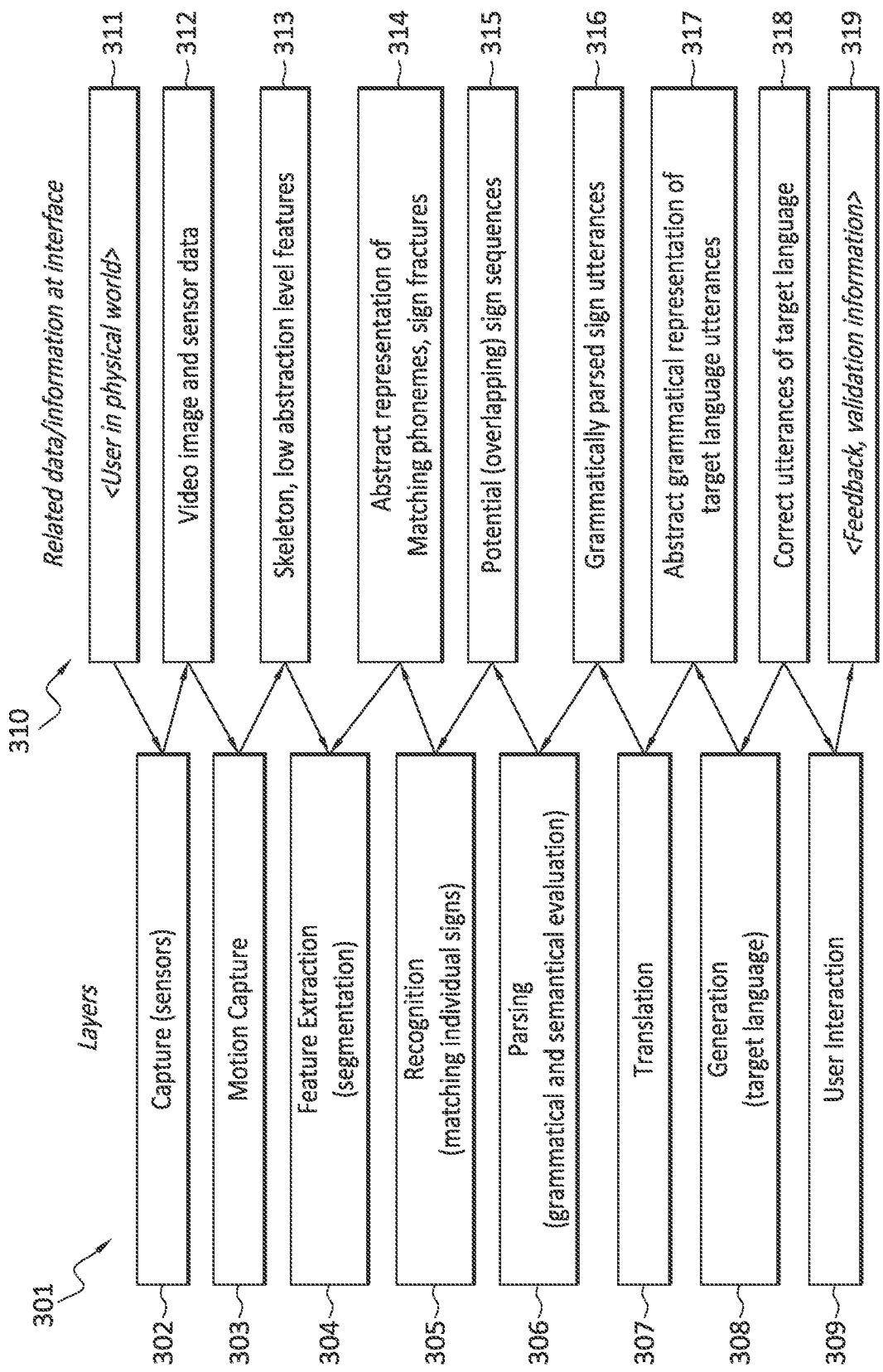
FIG. 3 illustrates the layer structure of the processing of a sign utterance along with the related data/information at the interfaces between the layers.

FIG. 2 illustrates an exemplary use of an embodiment in a booth configuration optimized for remote interpretation and/or confidential situations. In FIG. 3, the signing user 201 has a conversation with the other party 202. The user 210 uses the display 203 and the other interfaces 208 besides signing and gestures. The scene is captured by the sensors, including for example, a depth sensor (3D camera) and color cameras: 204, 205, 205, and 207. The processing is done in the computer 209.

Embodiments may include other configurations such as a portable embodiment with different mounting and carrier devices; a vehicle-based system, systems where the technology provided is used in an arbitrary environment, where fixed mounted solutions cannot be used, and systems using an alternative display device in the form of projecting holograms for the visual interactions. An embodiment may be integrated into a vehicle such as a car, where the sensors may be integrated into the interior of the vehicle, and thus provides translation between the passengers of the vehicle. A similar embodiment may be used to provide means of communication between users in the vehicle and people outside, such as communication with a police officer or in a drive-in situation. Another embodiment may be integrated into a drone, or other device able to move, and can provide interpretation following or moving together with the signer, or provide interpretation, where environment does not make installed solutions feasible.

When using sign language to communicate, any kind of conversation or even a monologue is building a context of the line of thought being conveyed. Subjects are rarely repeated, instead they are only referred to with pronouns, and similar tools are used for reducing the redundancy in the text. Another typical case for sign languages is that grammatical tense is rarely marked explicitly in all sentences; a marker for time (e.g., 'yesterday') is kept semantically for until stated/marked otherwise, without any indication for timely aspects. This often means that the (e.g., past) tense of a sentence can only extracted from the context, as the sentence itself has no component marking the tense.

The context (previously uttered information) influences the way an expression is understood. Ambiguous phrases or even complete sentences (syntactic ambiguity) may, and often may only be disambiguated, if the previously uttered information, the context that is, provides information to narrow down the possible interpretations or, ideally, to resolve most ambiguities.

Sign languages tend to rely even more on context, as they have fewer tools to incorporate grammatical disambiguation via lexical elements and inflection. On the other hand, sign languages have wider possibilities for building a context (using the space via buoys, locations, classifiers). Further, sign languages (and gesture systems in general) rely more heavily on context as they have fewer tools to incorporate grammatical markers. However, a sign language has a broader spectrum of ways and apparatuses to build context (buoys, locations, classifiers, usage of space in general). In this sense, considering the features of both sign and spoken languages that cannot be captured in an orthographic projection, they appear to be more similar to spoken conversations than written ones. A spoken conversation can also incorporate intonation, rhythm, stress and other soft signals, but usually lacks explicit sentence boundaries, similar to sign languages. While sign languages tend to be used for everyday conversations, which is a less strict form, there usually exists a more formal version, better constructed (similar to the written form of a spoken language) with clearer sentence and clause boundaries, used in more official contexts usually referenced as the formal register.

Sign languages are more parallel in nature than spoken languages, as they do not use the single channel of sound. In contrast, they use parallel channels of each hand, the whole upper body and facial expressions (non-manual markers) with explicit grammatical functions.

Regarding recognition, these parallel channels should be extracted independently but evaluated together as they refer to the same thought. Translation, parsing and even (temporal) segmentation and even recognition cannot be done unambiguously at any given time, only as part of a greater scope, understanding and evaluating the context of the conversation.

For help in the following descriptions, signs in written text are often referenced by glossing, an English representation of the sign, typically fully capitalized; so FATHER represents the sign for "father". As there is no English counterpart always, this may not be a single English word: for example, CARDRIVE, where this sign can both mean "car" and "drive" depending on the context; or LIKE (SIMILAR) or LIKE(ENJOY) if the English word is ambiguous.

Ultimately, the unit of translation is not a single gesture/sign, but a whole utterance of signing. This is may be a sentence, but does not necessarily correspond to the grammatical definition of a sentence. Similar to a situation where an interpreter interprets for the signer, the signer produces a whole utterance, before the interpreter translates it. This is important, as even the signs may have different meaning based on the succeeding signs in the same sentence. Another aspect is that the translated language (e.g., English in one embodiment) may have different word order, so latter signs in the signed sentence may completely rearrange the word order in the translated sentence. A third (and maybe most interesting) case is when a sign is technically the same as a part of a different sign. For example, the first part of the sign "GRANDFATHER" is the sign "FATHER", and the second half of it is extremely similar to the sign "WILL", so any occurrence of . . . GRANDFATHER . . . will look very similar to . . . FATHER WILL . . . In a similar fashion AGREENOT (having the English meanings both "do-not-agree" and "disagreement") is very similar to ANSWER+ BUT. In this case only the other parts of the sentence can resolve the ambiguity of the sign recognition with the help of grammatical parsing.

The embodiments described herein do not make (final) decisions until the whole utterance is signed. Even the final gesture/sign boundaries are not decided before the whole utterance is signed. All phonemes/parsed sign fragments are cumulated, with each having a time interval and probability representing their confidence.

The following are examples of signed sentences where latter signs may modify the likeliness of previous signs in the sentence:
TALL BOY HAVE AGREENOT MOTHER BUT LONG NOT
The tall boy has a disagreement with mother but it is not long.
TALL BOY HAVE ANSWER BUT MOTHER LIKENOT ANSWER
The tall boy has an answer but mother does not like the answer.

Another benefit of processing batches of signs instead of every sign separately is the possible correction of the temporal segmentation set off by the grammatical analyses. In cases of compound signs or signs that are overly similar, the syntactic analyses of the series may determine which temporal segmentation is more plausible. Consider the following: the ASL sign DISAGREE may also be segmented, especially if it is realized that there are hardly any pauses between signs in spontaneous/natural signing, as ASNW-ER|BUT. Because the process handles the surrounding signs as well, it is clear from the context which segmentation to choose.
Correct: IDEA|FATHER|DISAGREE ('father disagrees with the idea')
Incorrect: *IDEA|FATHER|ANSWER|BUT ('*father is idea answer but')

The need for interpretation between a sign language and a spoken/written language user can arise under various circumstances. These situations may all provide valid use cases for the technology. In all the situations below any of the participants may be using sign language.

An important use case of the embodiments described herein is the process of translating sign language from a captured scene containing a sign language user and their signing space into written text of the target language.

FIG. 3 illustrates the layer structure of the processing of a sign utterance along with the related data/information at the interfaces between the layers. The processing of the sign utterance may be decomposed into smaller tasks which each may correspond to a component of the embodiment. As the processing of these tasks may (and typically will) overlap each other in time, these components may be referred to as layers.

The capture layer 302 is the first layer, and the capture layer 302 captures the scene with optical/imaging sensors, cameras or 3D cameras, etc. Its input is the captured scene 311 with the user in it. This is analogous to the human observer of sign language. Having sensors with less spatial and temporal resolution than the human eye may be compensated by having more sensors that are spatially and/or temporally calibrated to each other. The output of the capture layer 302 is the image and depth data 312 that captures the user. Additional data, for example, calibration data may also be part of the video image and sensor data 312.

The next layer is the motion capture layer 303. The motion capture layer 303 captures movements of the user into more abstract data, and this is often referred as motion capture. The resulting motion capture data representation 313 may be positions and orientations of joints for a skeleton model of the user. This is just one example of the sorts of motion capture data 313 that are possible, and other types of motion capture data 313 may be captured and used as well. In this case, additional sign language specific features may also be extracted, such as facial markers, direct facial features, hand shapes and possible hand configurations. This feature extraction may be carried out using various methods including machine learning techniques.

The next layer is the feature extraction layer 304. The feature extraction layer 304 may take the "raw" motion capture data from the motion capture layer 303 and transform it into phoneme and sign fracture data 314 which represents the captured movements of various aspects of sign language. The resulting phoneme and sign fracture data 314 may be an appropriate abstract representation of an utterance of signing. This feature extraction may be carried out using various methods including machine learning techniques.

The next layer is the recognition layer 305 that matches signs to intervals of the phoneme and sign fracture data 314. Appropriate patterns for matched signs may be defined in a dictionary. The potential sequences of matches, including potentially overlapping matches, with corresponding time intervals and confidences are output by recognition layer 305. This output is potential sign sequences data 315.

The next layer is the parsing layer 306 which seeks to recognize possible sign instances in the potential sign sequences data 315 by parsing and evaluating it into abstract representations of parsed signed utterances 306. These parsed signed utterances may be evaluated and validated by grammatical correctness and semantic compatibility with the context of the conversation.

The next layer is the translation layer 307 that translates the parsed signed utterances 306 into the target language as target language utterances 317.

Next, the generation layer 308 uses the translated representations of the target language utterances 317 to generated appropriate target language representations 318 to be perceived by the user. The target language representations 318 may include text in case of a written target language, sound/generated speech in case of a spoken target language, and visual representation (e.g., a moving avatar) in case of a target sign language.

Finally, the user interaction layer 309 presents the target language representations 318 to the user so that the user may perceive the results, and may interact with the system in response to the target language representations 318 presented by the user interaction layer 309. The user interaction layer 309 may use a display for this purpose or a speaker for a spoken representation (in case this interaction is intended to be perceived by all participants). User interaction is extremely important in an interpretation situation, as this is where the signer can validate and resolve ambiguous translations and the user interaction layer allows for such user interaction. Interaction can be implemented in more languages. In situations where source and target languages are culturally close such as ASL and English, the validation interactions for the user may be displayed in written text of the target language. This expects the signer to validate the translation in the target language. In this case. the sign user wants to have control on the translated sentence, and have the means to choose from the provided options in the target language. This provides a direct validation, but requires knowledge on the target language. In the case, when the sign user has insufficient knowledge or intention of validating on the target language, the interaction layer may use the source sign language as the base for the interactions for validation. This means that an avatar impersonating the system may repeat (part) of the signed utterance recognized by the system as a form of assurance that the signs recognized are the signs intended in the utterance. It may be enough just to repeat the signs with low recognition confidence or those that are ambiguous based on the context. Another option is that the avatar may ask back questions about the signed utterance reassuring the validation. This is directly analogous to what happens for interactions with a human interpreter. In case of ambiguity, a human interpreter naturally asks for clarification often in appropriate situations. These two cases are directly connected to the general design of the user interfaces that may use primarily a written language, or a sign language. Having an avatar impersonating the system provides natural communication channel for having two way interactions in sign language. The generating of the signing of the avatar is detailed later in the generation for target language section.

These layers may be arranged into groups corresponding to an abstraction level. For example, the capture layer 302 and user interaction layer 309 may form the interfaces to the real world. The motion capture layer 303, feature extraction layer 304, recognition layer 305, and parsing layer 305 may correspond to the generation layer 308 as forming its inverse, with the translation layer 307 in the center connecting the source and the target languages.

Other use cases may define other similar layers. The natural inverse direction of text-to-sign or speech-to-sign use cases add may add a text parsing layer and a speech recognition layer.

There are other components that are not structured by this layer structure, such as the sign databases, user data, and dictionaries used. These are typically not changed throughout a session of usage, but have significant role in the functioning of the layers mentioned.

The computations and the processing for the various layers may be done either fully, or partially or in a distributed manner in the device containing the sensors, may be done on a dedicated hardware (e.g., PC, tablet, embedded system, etc.), remotely on a server, in a cloud-based server cluster or any other means of providing a computational capacity. Even processing corresponding to different layers may be done on different platforms. For example, the motion capture layer 303 may run on an embedded system in the sensor device, while the feature extraction layer may be implemented on a tablet or PC connected to the sensor via USB or some wireless connection, while the parsing layer 306 and the translation layer 307 may be run on a cloud base system ensuring the most up-to-date models and dictionaries possible, and the generated result may be observed by the other party remotely by a different client. In another embodiment, the full process may be implemented locally in a single device, with both of the communicating parties being in the same location, without the need of any connection to remote devices or servers. This latter case may be advantageous in situations where internet connection is not available, if quality/bandwidth is insufficient, or when complete discretion must be guaranteed. Another embodiment the processing may be implemented in the cloud, with a simple device with appropriate sensor(s) acting as a client for the user. This would provide minimal local computer capacity need at the trade-off of higher network bandwidth.

The first task is capturing the user and their signing space in the scene. An embodiment might have one or more cameras, 3D cameras or other visual sensors that observe the scene. A more robust embodiment may have multiple cameras (e.g., web-cameras, 3D cameras or other sensors) capturing the scene from different points of view (e.g., from the sides of the user, from the top, and from the front), and a depth sensor (3D camera) may capture the scene from front of the user.

A more compact embodiment may be a single device with computing power, a 3D sensor and a color camera (e.g., a tablet or smart phone with appropriate sensors or similar specialized hardware).

An embodiment with multiple sensors may require methods for calibration of such sensors. A spatial calibration method may be provided for acquiring exact locations of the sensors. Temporal calibration methods may be provided to transform timestamp of each frame/data in each sensor into a common timescale and offset. Spatial calibration may be supported with dedicated calibration object with known size and/or position and/or orientation. Temporal calibration may be supported with direct connection of the devices providing a synchronization signal.

The capture of the scene may be enhanced by marking some feature points of the hands of the user. In sign languages, various finger configurations are used (referred as hand shapes) and the fingers of the hands are often heavily occluded by other fingers. As the size of the signing space (interest volume of the signing) is defined by the space arm-reach from the user's upper body, even with high resolution imaging sensors have lower relative resolution at the fingers, which may cause ambiguity when processing the hand areas for the finger configuration recognition. Adding some unique or less ambiguous markers to the scene may greatly enhance the quality of motion capture of the scene.

Figure 6:
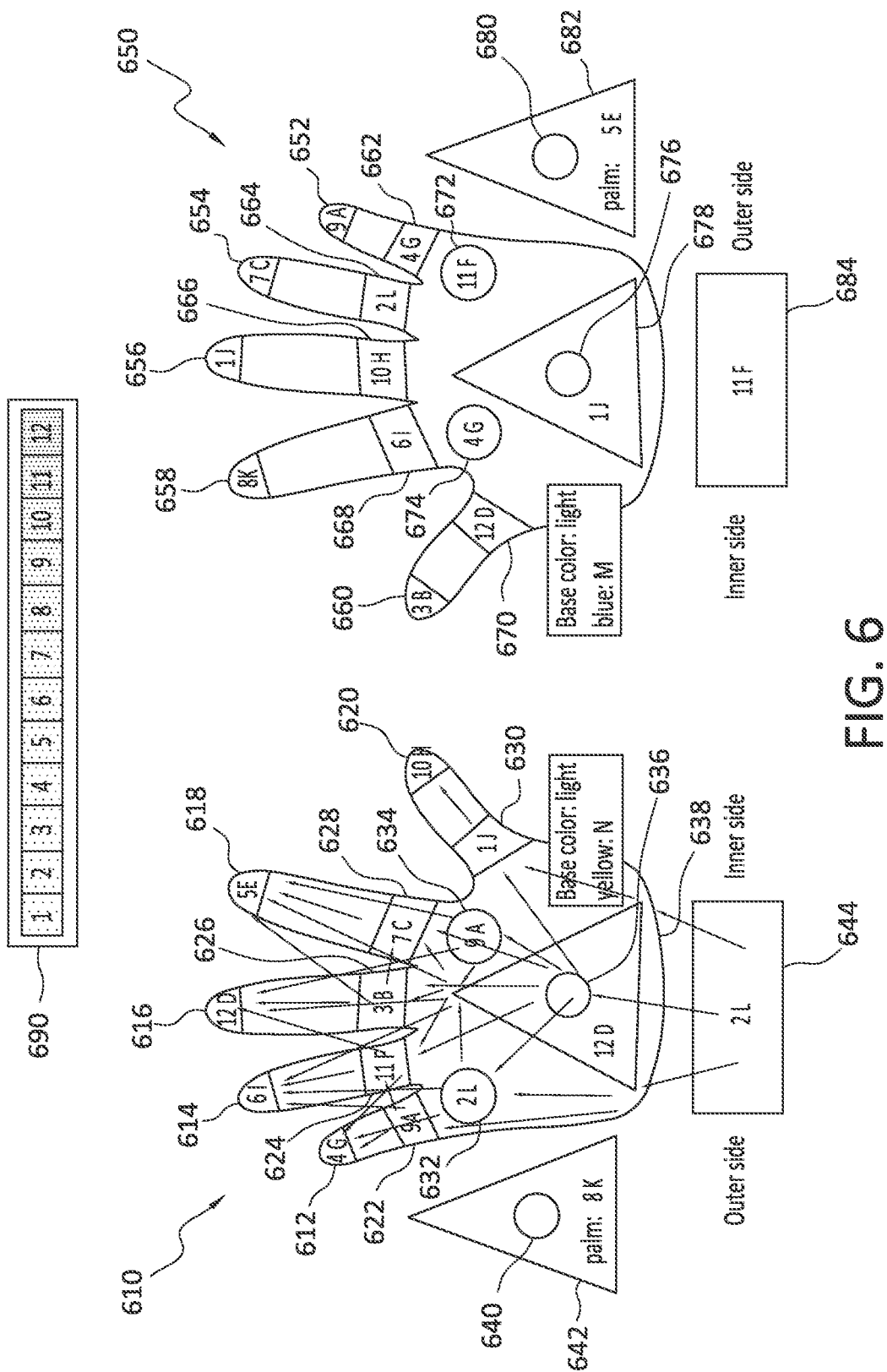
FIG. 6 illustrates an exemplary embodiment of a marked glove configuration.

In one embodiment, colored gloves may be used as a means of providing appropriate markers on the hands. FIG. 6 illustrates an exemplary embodiment of a marked glove configuration. FIG. 6 shows a back of a left-hand glove 610 and a back of a right-hand glove 650. A reference color code palate 690 shows the different colors used on the gloves. Each of the colors in the color palate may have a very specific color that may easily be detected by the motion capture layer 303. In one embodiment, arrangement of markers can correspond to positions on the hand significant to sign languages, e.g., fingertips, wrist, center of palm, center of back of the hand, blade of the hand. Additional markers can be used in an arrangement where marker positions define finger configurations more precisely, e.g., multiple markers may be used on fingers to detect bending of the fingers. Markers may also be used with definite direction, or detectable corners as well as multi-colored markers. More specifically, for example, each fingertip 612, 614, 616, 618, 620, 652, 654, 656, 658, and 660 may be marked with a different unique color. The base of the fingers 622, 624, 626, 628, 630, 662, 664, 666, 668, and 670 may be marked with further different unique colors. The backs of the hand may further include upper marks 632, 634, 672, and 674, triangles 638 and 678, and center marks 636 and 676. The palms of the gloves 610 and 650 may include triangles 642 and 682 and center marks 640 and 680. Each of the different delineated areas will have different unique colors. The wrists of the gloves 610 and 650 may include markers 644 and 684. Near-visible IR and UV markers may be used. UV reagent paint may be used to enhance robustness in various lighting environments and avoiding saturation loss. When using colored markers, a color calibration method may be provided. For this either the gloves can be used, or dedicated calibration object can be used (using the marker colors or other reference colors). The base of the gloves may have unique colors as well, where such colors would not be confused with potential natural skin colors of users and helps distinguish the markers from the other hand when the hands are close. In case where better visual conditions are expected, less markers can be used. Especially markers 632, 634, 672, and 674, and wrist markers 644 and 684 may be omitted.

The motion capture layer 303 is where the video image and other data 312 from the sensors or capturing devices (e.g., images, depth maps, 3D point clouds, user masks, timestamps, spatial-, temporal- and color-calibration metadata, features extracted by sensors or other dedicated devices) are extracted. The purpose of the motion capture layer 303 is to structure the data and extract the sign language related data from the general capture of the scene. In one embodiment, the resulting features may include the following examples: a skeleton representation of the user with location and orientation for all the joints. Tracked and/or estimated markers from the scene include key points of the face, the hands (including fingers), and the body. Various features of the environment may be included (the intended observer's position relative to the user, vertical direction of the world, level of ground, etc. The position and direction of other components of the system (e.g., displays) which may influence the signing. Multiple meshes and structured points of interest may be extracted so distances of surfaces may be estimated between any part of the body, specifically between hands, parts of the hands (e.g., fingers, palm, wrist, etc.), parts of the body (shoulders, chest, neck, legs, etc.) and face (forehead, chin, mouth, cheeks, jaws, ears, nose, temples, etc.).

Sign language specific features may be extracted directly from the sensor data 312, or as derived data such as probability and orientation of predefined hand shapes (finger configurations) from a dictionary, direction and bending of fingers. Velocity and other temporal features of body parts, feature points, etc. may also be extracted from the sensor data 312.

The goal of the feature extraction layer 304 is to provide a probabilistic phoneme/sign fragment representation 314 of the sign utterance provided. Both spatial and temporal aspects are extracted among other more abstract, derived phonemes. Probabilistic means that all phonemes/sign fragments 314 have a confidence value regarding the certainty of that item, and all phonemes/sign fragments 314 correspond to time intervals of the sign utterance.

Spatial phonemes/sign fragments 314 includes location and orientation information. Distances and relative positions of markers of interest (e.g., fingertips, hands as a whole) may be extracted. Velocity, direction, and amount of movement may be extracted for the markers. Orientation and change of orientation may also be extracted.

Special dedicated phonemes describing the various hand shapes (finger configurations) and their confidence values may be used. These special dedicated phenomes may all contain the most likely position and orientation (in the form of e.g., a rigid transform) for each possible hand shape.

Temporal segmentation is the basis of forming phonemes spanning a time interval (e.g., two markers touching may be an instantaneous phoneme, while a slow movement would span a significant time interval). This allows matching of a sign to a seen utterance even if the tempo of the signing is significantly different from the typical tempo of the signing, Also, there may be multiple interpretations of the movements into segments, as movement boundaries are often ambiguous.

Phonemes/sign fragments are extracted describing the movements of relevant markers.

Abstract derived phonemes are also extracted based on both spatial and temporal features e.g. symmetries/asymmetries/anti-symmetries of movements, of hand shapes, consistencies between features are recognized as phonemes (e.g., direction and orientation of the hand are consistent with the direction of the movement).

The task of the recognition layer 305 is to provide sign matches onto the phoneme/sign fragment stream, and as such into the time intervals of the sign utterance. Recognition and pattern matching of the signs can only be discussed together with the models and patterns trained behind. The features and matching algorithms encapsulating information that define how it is evaluated that a sign is matching a given interval of the utterance with some confidence are referred to as sign patterns.

The dictionary building for the patterns used for the matching may involve building statistical models or other machine learning tools based on prerecorded and annotated corpus. Models should be built/trained on a wide corpus with real sign instances for robust results. There may be additional generated data used providing means against overtraining the models. Generated data may be in the form, of altering real human signing data altered by generated noise. In this case applied noise may be generated based on the estimation of variances from the real human data. An embodiment may build models based on entirely generated data base on e.g., an animation, and potentially alter it by noise.

Every sign pattern may include a weight distribution defining how important each feature channel is regarding that given sign. This means that some sign may be recognized based dominantly on the handshape and movement, while another based dominantly on handshape and location of the dominant hand relative to the face. This can be used accordingly in the evaluation and matching of the sign pattern to the sign fragments of given sign utterance. Signs and their patterns may be categorized into visually or algorithmically similar groups in the phase of training. This categorization may be done manually based on intentions incorporated in that sign, or algorithmically based on the distribution of features in the training data. This categorization provides information not only to the recognition part, but later to the grammatical parsing layer, where parsing can expect frequently confused signs, and may replace them with similar, but grammatically/semantically more fitting signs.

Models trained for patterns can be global, can target given subset of signs (e.g., on handed signs, two handed signs, fingerspell-like signs, lexicalized signs, etc.), or even models targeting single signs, or heuristic methods targeting specific signs. The decisions of these methods may be evaluated based on a hierarchy of these models.

A given sign may be recognized based on a plurality of patterns. These alternative patterns may be defined algorithmically based on the training data. A typical example for a sign where it provide useful is the case of compound signs such as "TEACHER" which is a compound of "TEACH"+ "PERSON". In clear and formal signing this contains two separable movements for the two signs in the compound accordingly, but in natural signing these movements are merged into a single movement. Providing multiple patterns for this sign can incorporate both cases, where any decision of the segmentation can match to the appropriate pattern resulting a match in both cases.

Dedicated sign patterns and methods for matching may be implemented for signs with special importance or otherwise hard to detect/match. Natural examples are "YES" and "NO" and pronouns, where usage and inset into sentence is also different from the typical signs. Specially, patterns may be directly implemented for extremely short signs, or in cases where unique features should be extracted, e.g. direction of index finger may have much more significance and even resolution in a pronoun than in a typical sign, and thus this feature must be extracted with more precision in that case.

In the parsing layer 306 the given possible sign sequences are parsed and evaluated based on the grammatical correctness and the context of the conversation. The process of this layer is described later in detail.

The translation layer 307 is where the pure translation happens. This is the only part of the system, where both the source language and the target language matters. In one embodiment the translation may be based on the word-to-word (sign-to-word) matching of the source and the target language. Another embodiment may generalize the matching to a phrase-to-phrase matching, so expressions having a single sign, but having a multi word expression in the target language may be translated correctly even if grammatical context requires changes in the dictionary form. For example, in ASL "THANK_YOU" has a dedicated single sign, while the English translation has two words. Similarly, in ASL "BRUSH_TEETH" is a single sign, but translating the sign without using a phrase basis, it would be hard to put the sign correctly into e.g., past tense.

The task of the generation layer 308 depends highly on the target language. For a written target language, the generation of a correct text from an analyzed parse tree of the same language is significant, but common task. For a spoken language, speech generation from the similar data is a bit more demanding, but still an available feature. These functions may be implemented internally in one embodiment, but may also use other existing solutions, thus only interfacing those solutions.

For sign languages this task is the most tedious. Providing a signing avatar with a natural feel requires various additional features above simply generating the animation of the avatar based on the phonemes or other representation of the generated sign sequence. Non-manual markers (e.g., head, eye, mouth movement, body movement and facial expressions) must be generated in high quality as they form an important subset of communication channels. Sign transitions should be smoothed and timing should not disturb the intelligibility of the signed utterance. Idle movements, breathing, blinking and other natural movements should be incorporated in a consistent manner. "Intonation" of the sentence via non-manual markers (body movements, rhythm of signing) should also be incorporated.

The boundaries between the parsing, translation and generation layers may be less articulate in case of certain language pairs (e.g., when the target language is more grammatically similar to the source sign language). A more specialized embodiment may implement these layers as a single layer providing more direct connection between the languages.

Specialization to a given user on many layers may enhance the efficiency of the system by using best parameters of the algorithms for that user. This specialization is optional as the system fundamentally does not require a priori knowledge on the user, but can be used for enhanced precision and user experience. The system may adapt internal parameters for the user based on the recognized features throughout the session of use. Though this is the typical use case for a new user or an anonym use of the system, in case of a known and returning user of the system this may be enhanced by saving these parameters for the user. In some cases these data may be provided directly in a calibration step. Adapting parameters can appear in various ways depending on the layer. The motion capture layer may utilize user specific parameters such as the body proportions, proportions of the face, size of the hands and such. These are measured as the part of the motion capturing process, and may be adapted to continuously, but knowing median data beforehand may enhance motion capture from the start of the session. These data may be extracted by a preliminary user calibration process, where user is expected to show simple gestures for a short time, such as showing '5' in front of them, so appropriate parameters can be measured. There may be a more complex option for user body/face calibration by expecting the user to show simple known signs or gestures. The feature extraction layer may adopt to variances of some recognized features specific to the user, e.g., showing some handshape in an atypical way, or use systematically smaller/larger movements than average. The recognition layer can exploit the sign preferences of the user as sign language users tend to prefer some variants of given signs over other signs having similar or identical meaning. Also, the recognition layer may exploit adaption to user gestures relating to some components of signing such as the position obtained between sentences and at significant pauses, the natural rhythm of one's signing, or the amount of pause naturally taken between sentences or clauses. An embodiment may enhance recognition based on adapting to these characteristics significantly. The parsing layer may exploit user preferences in grammatical use of signs and sign variants. Sign users (similarly to spoken language users) tend to use variants of signs consistently based on the grammatical context.

Figure 5:
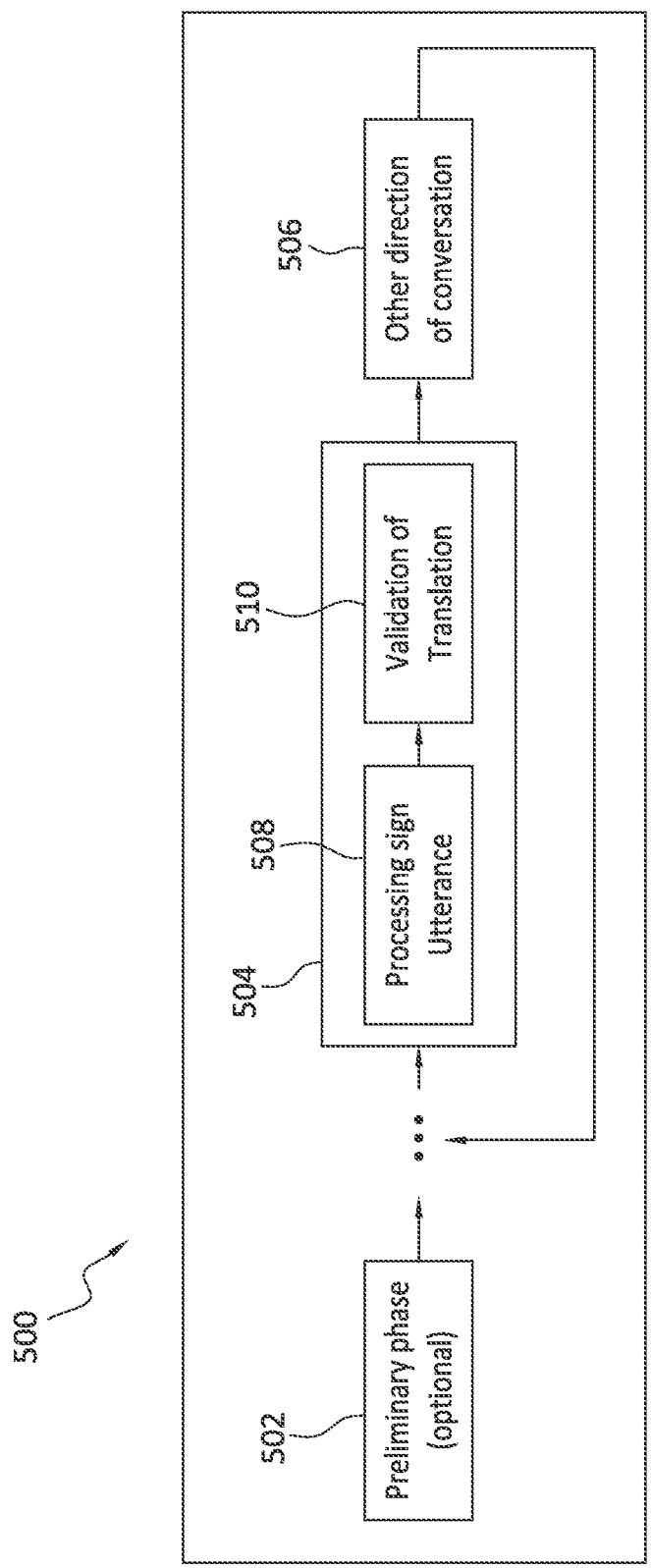
FIG. 5 illustrates the temporal structure of the processing.

FIG. 5 illustrates the temporal structure of the processing. The longest unit in time is a session of use. A session of use starts when the user gets in the sight of the sensors and starts to use the system and ends when the user leaves, or stops the system, that is when the last data is received from the sensors. In the interval of this occasion there may be some optional preliminary phases 502 (e.g., calibration), which may be repeated during the session either triggered by the user or by the system itself.

The main pipeline of processing 504 may be divided into processing sign utterances 508 and validation of translation 510. An utterance is a part of continuous signing intended as a whole thought. This may or may not correspond to a grammatical sentence or clause, but can be a phrase or a single sign, e.g. in one sign answers. An utterance is typically translated as a whole, which means that the individual signs are normally not recognized one after another, but in natural batches. Boundaries of the utterances may be explicitly indicated by the user (e.g., by putting down their hands), or algorithmically (e.g., detecting significant pause in signing). This is the analog to the case of a human interpreter, where interpretation is started after an utterance or a phrase, and not after each individual sign, or at least with an overlap where intentions can be resolved.

For each utterance, a (maybe incomplete) translation is provided, or in case of ambiguity, the most probable translations are provided in order of (decreasing) confidence. This translation, or the possible translations are then optionally accepted or declined by the user 510 via gestures or other means such as interacting with an avatar mentioned previously. This ensures the integrity of the conversation, and provides a consistent context for translation and evaluation of the latter utterances. As mentioned before, these translations may be directly provided for validation on the target (written) language, or validation may be done by interactions with an avatar visualizing the optional translations for feedback in the source sign language.

Units of the opposite direction of translation—from the other party at the conversation translated into written text or signing of an avatar—may be interleaved between the processing of the utterances as needed 512. This completes the full two-way conversation in a dialog manner. The utterances in the opposite direction may be displayed in a parallel manner, without delay.

In the interleaved case, the communication is similar to a written dialogue with clear alternating iterations of utterances on each side. This alternating structure is typically represented in the manner it is displayed. This produces a consistent dialogue, where the possible questions and answers are in order, and the flow of the communication is clear.

In the parallel case, the communication is similar to a spoken/signed dialogue where utterances may occur simultaneously. This is typical for chat applications, where any party can start an utterance at any time, and they are shown on the other side in a parallel manner independent of the state of the communication of the other party. In this case the visualized order of utterances is usually decided based on the end time (less often the start time) of the utterances.

In both cases, there may be more than two parties in the conversation as may occur in a multi-party conversation. Each sign using party may use their respective system for the sign capturing and the translation.

Processing an utterance is normally performed as a whole, only resulting in translation after the processing of the whole utterance. There may be exceptions in cases when user experience requires imminent feedback. Direct representation of written text and digits is possible in many sign languages, referred as fingerspell in ASL. The case of fingerspelling is one of these typical examples, where typos should be revealed as soon as possible and for lexicalized signs or other signs whose recognition do not require grammatical context and may be evaluated instantly after the whole sign is signed or even instantly e.g., after each letter or digit in fingerspelling. This direct form of representing written literals by signs are used in two typical manners. The first is when such usage acts as a loanword from a written language. In this case, the provided words are expected to be enumerated in a dictionary. Possible misspellings in recognition of the letters/digits may be corrected by choosing the best fitting word from the dictionary. The second usage of these fingerspell inputs are when the signed word is a spelling-critical expression in a written form (e.g., web-urls, proper nouns as one's name, telephone or serial numbers, etc.) In this case feedback and method for ensuring spelling correctness is essential.

The exceptional case of spelling-critical direct written text and digit input (fingerspell) may be handled uniquely by interleaving fast, interactive sub-sessions into the normal flow of the recognition of the utterance. This interactive session may be invoked by sufficient confidence in recognizing fingerspelling. This case may be explicitly marked by the user via gestures that are less confusing with other signs. This may be pointing the other (non-dominant) index finger to the wrist of the dominant hand while fingerspelling, which is a natural emphasis of fingerspelling in ASL. In this interactive sub-session direct feedback may be provided on the recognized letters and digits. Special gestures may be used by the user for interactions such as deleting last letter/digit, inserting 'space' or starting new word, or changing between digit, letter input or mixed input. In ASL 'W' and '6' are practically the same with minor non-manual (mouth) differences, similarly 'O'/'0', 'F'/'9', etc. As such, distinction must be provided by the user in case of e.g. serial numbers where both can appear.

This translation system is unique as it does not work on a per-sign basis. Even utterances of the continuous signed conversation are segmented dynamically into batches for processing.

Each sign utterance is processed in a similar manner, not continuously, but collecting the observed data until confidence of the parsing of the collected data is reached. This also means, that the layers defined above do not work together in a strictly linear manner like in a simple pipeline, but they interact, trigger each other, and even provide feedback to the previous layers. Different layers may have different protocols for the temporal aspects of processing. The motion capture level mostly processes data on a per-timestamp basis, similar to the extraction of some spatial features in the feature extraction. On the other hand, temporal segmentation in the feature extraction layer 304 requires the finishing of the atomic movement of the user. It means that until the user finishes the current movement, the feature extraction layer collects the continuous (per-timestamp) features of the motion capture layer 303 and some derived features. An appropriate result is only provided to the next layer when confidence of the user finishing that movement has reached a given level.

Figure 4:
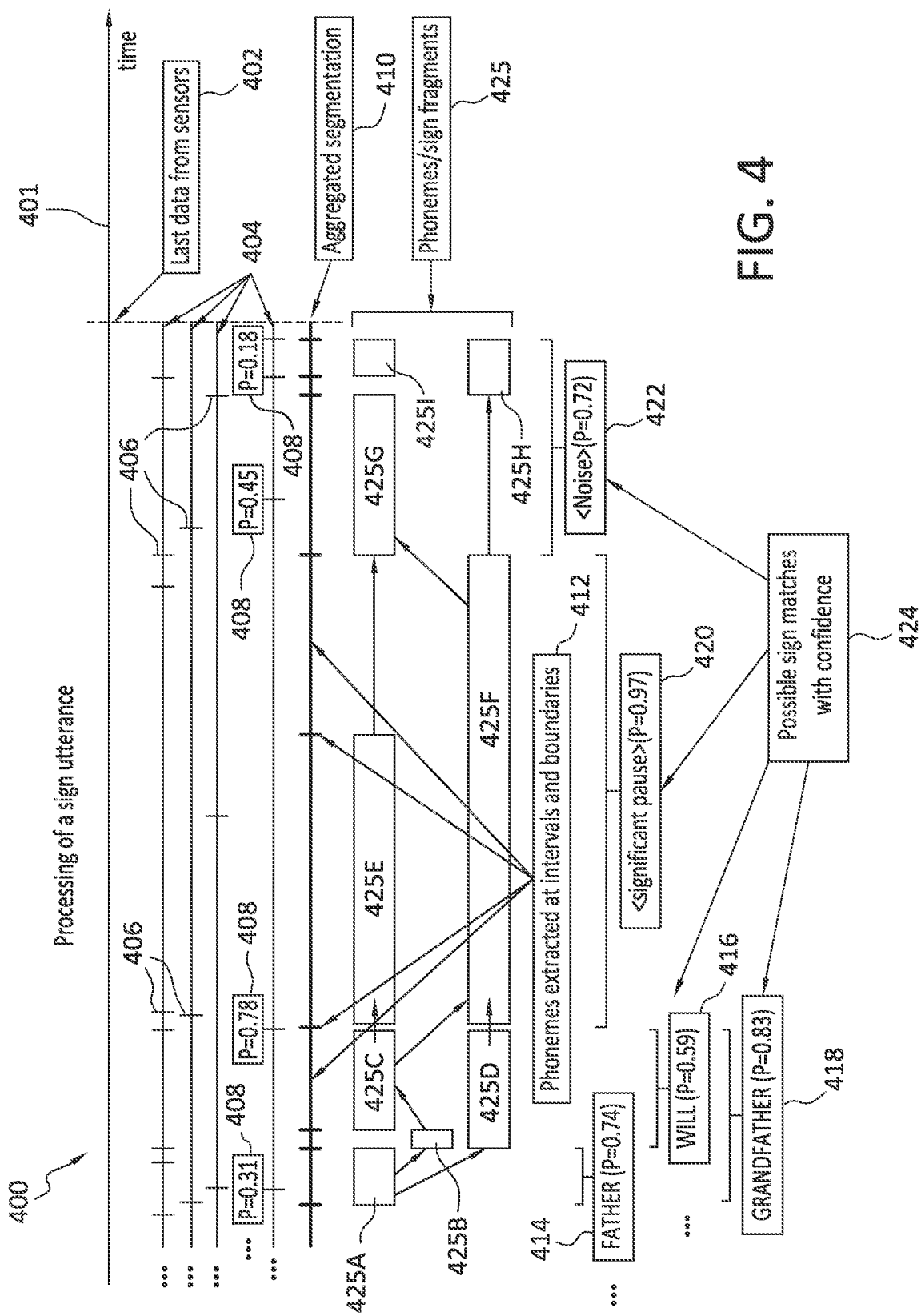
FIG. 4 illustrates the timing of the processing of a sign utterance.

FIG. 4 illustrates the timing of the processing of a sign utterance. In FIG. 4 a timeline 401 showing the passage of time is shown at the top. The vertical line 402 shows the time as which the last data of an utterance has been received from the sensors. Then timelines 404 are shown for each of the features extracted from the feature extractions layer 304. Each of these extracted features 404 may be segmented as shown by 406. Also, a confidence 408 may be associated with each segment estimating the confidence that the indicated boundary is correct. Temporal segmentation of the features are processed separately for different types of features. For example, the movements of each hand, the features of the face, and the body are segmented independently.

An aggregate segmentation 410 is extracted by the feature extraction layer 304, with confidences of the boundaries. There may be aggregations across these features, e.g. the features of the non-dominant hand may be aggregated based on the segmentation of the dominant hand, as this often provides relevant result the sign being structured by the dominant hand. Possible suggested concatenations of the segments are also provided based on the confidences and other features of the aggregated segments. This means that segments are not a strictly linear structure. A big arc of hand movement may be treated as a single longer segment (segment of 425D), but may also be treated as concatenation of two smaller arcs (segments of 425B and 425C). Features aggregated at the intervals and the boundaries of the possibly aggregated segments together with these segments form the phonemes/sign fragments. In the example the bigger arc and the smaller arcs all provide their respective phonemes/sign fragments (425B, 425C, 425D). This also means that the intervals of these phonemes/sign fragments may intersect. These phonemes/sign fragments 425 may be extracted based on the appropriate aggregation of features (404) on a plurality of intervals of the aggregated segmentation (410). These phonemes/sign fractures naturally form a graph with edges pointing to the possible succeeding phonemes/sign fragments (425A to 425B and 425D; from 425B to 425C, etc. as indicated by the arrows). There may be skipped intervals (e.g., between 425E and 425G) of the aggregated segments, and some phonemes/sign fragments may not have successors besides the phonemes/sign fragments at the end of the utterance (e.g., 425G). These phonemes/sign fragments are used in the matching of signs onto the intervals of the feature stream by the recognition layer 305. Signs detected are matched to parts of paths in the graph of phonemes/sign fragments (e.g. sign GRANDFATHER (418) is matched to the path 425A→425B→425C). Sign matchings 305 are evaluated based on these sign fragments. A sign may match to one or more concatenated sign fragments. Some sign fragments may be omitted because they are treated either as transitional, or as noise 422. Special sign roles may also be decided (e.g., pause, inactivity, etc.). These do not correspond to real signs, but intervals of sign fragments matching these intervals of the sign utterance (e.g., pause, sections 420 between sentences, noise, etc.) containing significant information.

FIG. 4 illustrates phonemes/sign fragments 425A-H. As can be seen, various parts of the aggregated segmentation 410 may lead to multiple different phonemes/sign fragments. For example, phonemes/sign fragments 425B and 425C overlap with 425D. In a similar manner, the phonemes/sign fragments 425E and 425F overlap as well as phonemes/sign fragments 4251 and 425H. Further, arrows connecting the different phonemes/sign fragments show potential paths and connections between the phonemes/sign fragments that may lead to utterances.

In this way, a variety of different types of matching between signs and intervals of the aggregated segmentation may be provided through the graph of the phonemes/sign fragments. These may form a variety of possible sign sequences, all having confidence values either for the individual matched signs, and the transitions between the matched signs in the sequence. These possibilities may be regarded in a more abstract way as a directed acyclic graph (DAG) with the possible sign matches being nodes, and the possible succeeding signs (transitions) defining the (directed) edges. This graph is weighted both on its nodes with confidence of the match of the sign to the corresponding interval of features defined by the corresponding segments of the segmentation; and the edges with the confidence of the transition between the two signs and the corresponding features on the corresponding segments.

This means that even after the recognition layer 305, a final decision about the segmentation is not made, and possible variations are kept in the form of the possible sign sequences, that is, different paths in the graph. These decisions are made in the parsing layer 306, where the sequences are evaluated via both their confidences on the path and their possible parsing regarding the grammatical context.

The recognized signs of an utterance create possible sign sequences, leaving room for cases when one or more signs in the utterance cannot be determined with high enough probability to exclude other possibilities. This means that if one part of the utterance (a sign), due to co-articulation or other factors, fulfills two or more abstract requirements, multiple series of signs get passed to the next processing step, where grammatical patterns are looked for to select the most probable variation. The sequences of signs with the highest probabilities are parsed, identifying key phrases, and resolving references, whether certain sign language pronouns refer to previously occurred noun(s) or noun phrase(s). Reference and co-reference resolution is of high importance because sign language pronouns are not as grammatically marked as, for example, the pronouns found in Indo-European languages (which are often marked for person, number, gender and even animateness). The parsing identifies possible grammatical roles (subject, object to name a few) and as a result, if the utterance contains more than one syntactic sentence, will extract them. From the parsed trees, measurements are made to determine whether certain trees belong to a single compound sentence, namely a sub- or coordinating sentence including two or more parse trees. The resulting sentence parse trees are evaluated based on the confidences of the matches in previous layers, parse tree complexity and grammatical likelihood, and likelihood based on context, and the sentence candidates are ordered by their score. The parse trees, which, at this point, are analyses of sentences are generated into the target language. The most suitable translation candidates are displayed to the user, so they can select the best one.

The utterance shown in FIG. 4 may include a significant pause 420 with for example a confidence of 0.97 and then noise 422 with a confidence of 0.72. Further, different potential translations of FATHER 414 with a confidence of 0.74, WILL 416 with a confidence of 0.59, and GRANDFATHER 418 with a confidence of 0.83 may be extracted from the aggregated segmentation 410. In this case, GRANDFATHER 418 has the highest confidence. There are more possible sign sequences that have parsings containing these signs, then the sequence containing the better fitting match of GRANDFATER will be presented to the user as the most likely translation. If the phrase FATHER WILL has as confidence with a threshold distance of the confidence level of GRANDFATHER, then both alternatives may be presented to the signing user. On the other hand, if the parsing can filter out all sign sequences containing GRANDFATHER as grammatically incorrect, then the less likely, but grammatically parsable option of 'FATHER WILL' will be chosen.

The input from the user, regarding the quality of the proposed translations is used to create a better model of the context. This means that upcoming translations, after the feedback from the user, will be generated with respect to the intentions of the user. This way the whole process, with multiple utterances, produces a series of coherent sentences in the target language, making the experience more conversation-like, lowering or eliminating the alienating artificial feel of the produced target language text.

There are various features measured in the feature extraction layer 304. These features are extracted in a parallel manner, and their natural temporal segmentation is extracted independently for each group as shown by 404, 406, and 408 in FIG. 4.

The first group may be the shapes of each hand recognized independently. Hand shape is the notion of the relative positions and orientations of fingers and knuckles on the hand. Multiple kinds of features are extracted in a continuous manner at each timestamp from each hand. The first is a fitted abstract model of the hand onto the acquired sensory data. Fitting is done in a continuous manner, taking into consideration the natural restrictions of a hand. It may result in multiple local best fittings with a probability value representing the quality and the confidence of the fitting. The hand skeleton model can be optionally continuously adapted to the observed data (length of bones, intervals of DoF (Degree of Freedom), etc.). The second kind of feature may include matching a given predefined set of hand shapes with the sensory data. In this case, a probabilistic value of confidence and a best orientation in the form of a rigid transform is extracted for each predefined hand shape. Reference hand shapes may be optionally adapted to the sensory data of the user to enhance precision. The third feature may include the best estimation of the continuous position and orientation of each hand in a form of an arbitrary rigid transformation. Trajectory of points of interest may also be extracted as a feature set—specifically predefined points of the hands which have significance in sign languages (fingertips, center of palm and back of the hand, wrist, blade of the hand, etc.). Arm positions (wrist, elbow and shoulder) are also used as features for the hand.

As for non-manual markers, numerous data may be extracted in addition to the manuals. Position and orientation of the user's (upper) body may be extracted as a group of features. Also, the position and orientation of the head/face may also be extracted as another group.

On the face, various facial non-manual markers may be extracted. The first facial group may include the gaze of the eyes. The second group may include the movement of the eyebrows/upper face which contains features such as eyebrow movement (raised, lowered, knitted), frowning, scowling, wrinkling of the (upper) face etc. The third facial group may include the movements of the mouth or lower face. Sign language use the mouth typically in two ways, so the extracted markers are matched to these usages. The first is when they use sign language phonemes articulated by the mouth/lower part of the face. This contains features such as primp/lip-rounding, pursing lips, parted lips, puckered lips, lips sucked in, flattened lips, lips turned up-down, retracted lips, protruding lips, lips articulating sounds, etc. The other usage is when a spoken word articulation is imitated (or just its sub-cases e.g., the first syllable or the vowel). The features extracted for this case are the confidences of correspondence to the visual representations of the spoken phonemes (e.g., vowels, consonants). The forth facial group may include the gestures of the head (tilt, shake, nod, etc.).

Derived complex features are also extracted. For example, the positions of the points of interest on the hands are observed relative to the position of each other (e.g., close or touching fingertips); relative to the points of interest of the other hand (e.g., touching the other hand); relative to the face (near or touching predefined areas of the face, including distance). Various other features may be extracted as the consistent changes in the continuous features—e.g., symmetries of the hand positions and/or movements, symmetry of configurations of the points of interest.

Each group of features (for each hand, the body, the head, the eyes, the mouth, derived features, etc.) may have its natural segmentation (boundaries of "movements") extracted. These boundaries may be extracted with a corresponding probability describing the confidence/strength of that boundary. These boundaries are grouped into various combinations of possible combined segmentations.

All continuous features may then be aggregated by their respective natural temporal segmentation(s). These aggregated data are both examined in the intervals and at the boundaries of each segment independently. There may be intersecting segments, in the case when segmentation makes sense in multiple variations, as mentioned above with an arc movement making sense as one bigger movement, or two successive smaller movement.

These aggregated features on the various segmentation intervals and boundaries are the phonemes/sign fractures that form the basic elements of sign matching.

The embodiments described herein solve the technological problem correctly translating signed performed by a signing user into another language. The translation language may be a written, spoken, or signed language. The embodiments described herein use a layered processing approach that seeks to identify a complete utterance based upon extracted phoneme/sign fragments that are then translated as a whole rather than simply sign by sign. Such processing helps to resolve ambiguities in the signing by considering the complete context to the utterance including the current and prior utterances. This approach also uses the grammatical analysis to determine the most likely translation of the signed utterance.

The embodiments described herein may be implemented as software running on a processor with an associated memory and storage. The processor may be any hardware device capable of executing instructions stored in memory or storage or otherwise processing data. As such, the processor may include a microprocessor, field programmable gate array (FPGA), application-specific integrated circuit (ASIC), graphics processing units (GPU), specialized neural network processors, cloud computing systems, or other similar devices.

The memory may include various memories such as, for example L1, L2, or L3 cache or system memory. As such, the memory may include static random-access memory (SRAM), dynamic RAM (DRAM), flash memory, read only memory (ROM), or other similar memory devices.

The storage may include one or more machine-readable storage media such as read-only memory (ROM), random-access memory (RAM), magnetic disk storage media, optical storage media, flash-memory devices, or similar storage media. In various embodiments, the storage may store instructions for execution by the processor or data upon with the processor may operate. This software may implement the various embodiments described above.

Further such embodiments may be implemented on multiprocessor computer systems, distributed computer systems, and cloud computing systems. For example, the embodiments may be implemented as software on a server, a specific computer, on a cloud computing, or other computing platform.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A computer-implemented method comprising:
   receiving motion capture data of a sign language from a user;
   extracting a plurality of features from the motion capture data in parallel for two or more groups of features, wherein each group of features includes an independent temporal segmentation, wherein each group of features includes features extracted from the motion capture data from a plurality of channels, and wherein the plurality of channels includes a respective channel for each hand of the user, a body of the user, and a face of the user;
   aggregating the groups of features into an aggregate segmentation;
   determining one or more sign patterns in the aggregate segmentation, each sign pattern including a weight distribution defining an importance of each channel of the plurality of channels;
   recognizing one or more signs using one or more respective sign patterns of the one or more sign patterns;
   producing a plurality of potential sign sequences using the one or more signs;
   parsing the potential sign sequences to produce parsed sign utterances; and
   generating output utterances in a target language using the parsed sign utterances.

2. The computer-implemented method of claim 1, further comprising:
   displaying multiple candidate output utterances to the user; and
   receiving a selection from the user of a correct output utterance from the multiple candidate output utterances.

3. The computer-implemented method of claim 1, wherein extracting the plurality of features comprises extracting sign features from one or more hands and one or more arms of the user, and eye gaze features from one or more eyes of the user.

4. The computer-implemented method of claim 1, wherein recognizing one or more signs comprises generating one or more phonemes and associated confidence values indicating confidence in a phoneme.

5. The computer-implemented method of claim 4, wherein producing potential sign sequences comprises matching paths through a graph of the phonemes.

6. The computer-implemented method of claim 1, wherein parsing comprises using a grammatical context from previous utterances in a same conversation session to determine proper parsing of a current utterance.

7. The computer-implemented method of claim 1, further comprising applying user parameters at one or more of operations of: extracting the plurality of features, recognizing the one or more signs, producing the plurality of potential sign sequences, parsing the potential sign sequences, and generating output utterances in the target language.

8. A machine, comprising:
   one or more processors; and
   a memory storing instructions that, when executed by the one or more processors, cause the machine to perform operations comprising:
   receiving motion capture data of a sign language from a user;
   extracting a plurality of features from the motion capture data in parallel for two or more groups of features, wherein each group of features includes an independent temporal segmentation, wherein each group of features includes features extracted from the motion capture data from a plurality of channels, and wherein the plurality of channels includes a respective channel for each hand of the user, a body of the user, and a face of the user;
   aggregating the groups of features into an aggregate segmentation;
   determining one or more sign patterns in the aggregate segmentation, each sign pattern including a weight distribution defining an importance of each channel of the plurality of channels;
   recognizing one or more signs using one or more respective sign patterns of the one or more sign patterns;
   producing a plurality of potential sign sequences using the one or more signs;
   parsing the potential sign sequences to produce parsed sign utterances; and
   generating output utterances in a target language using the parsed sign utterances.

9. The machine of claim 8, wherein the operations further comprise:
   displaying multiple candidate output utterances to the user; and
   receiving a selection from the user of a correct output utterance from the multiple candidate output utterances.

10. The machine of claim 8, wherein extracting the plurality of features comprises extracting manual sign features from one or more hands and one or more arms of the user, and eye gaze features from one or more eyes of the user.

11. The machine of claim 8, wherein recognizing one or more signs comprises generating one or more phonemes and associated confidence values indicating confidence in a phoneme.

12. The machine of claim 11, wherein producing potential sign sequences comprises matching paths through a graph of the phonemes.

13. The machine of claim 8, wherein parsing comprises using a grammatical context from previous utterances in a same conversation session to determine proper parsing of a current utterance.

14. The machine of claim 8, wherein the operations further comprise applying user parameters at one or more of the operations of: extracting the plurality of features, recognizing the one or more signs, producing the plurality of potential sign sequences, parsing the potential sign sequences, and generating output utterances in the target language.

15. A non-transitory machine-readable storage medium storing machine-executable instructions that, when executed by a machine, cause the machine to perform operations comprising:
   receiving motion capture data of a sign language from a user;
   extracting a plurality of features from the motion capture data in parallel for two or more groups of features, wherein each group of features includes an independent temporal segmentation, wherein each group of features includes features extracted from the motion capture data from a plurality of channels, and wherein the plurality of channels includes a respective channel for each hand of the user, a body of the user, and a face of the user;
   aggregating the groups of features into an aggregate segmentation;
   determining one or more sign patterns in the aggregate segmentation, each sign pattern including a weight distribution defining an importance of each channel of the plurality of channels;
   recognizing one or more signs using one or more respective sign patterns of the one or more sign patterns;
   producing a plurality of potential sign sequences using the one or more signs;
   parsing the potential sign sequences to produce parsed sign utterances; and
   generating output utterances in a target language using the parsed sign utterances.

16. The non-transitory machine-readable storage medium of claim 15, wherein extracting the plurality of features comprises extracting manual sign features from one or more hands and one or more arms of the user, and eye gaze features from one or more eyes of the user.

17. The non-transitory machine-readable storage medium of claim 15, wherein recognizing one or more signs comprises generating one or more phonemes and associated confidence values indicating confidence in a phoneme.

18. The non-transitory machine-readable storage medium of claim 17, wherein producing potential sign sequences comprises matching paths through a graph of the phonemes.

19. The non-transitory machine-readable storage medium of claim 15, wherein parsing comprises using a grammatical context from previous utterances in a same conversation session to determine proper parsing of a current utterance.

20. The non-transitory machine-readable storage medium of claim 15, wherein the operations further comprise applying user parameters at one or more of the operations of: extracting the plurality of features, recognizing the one or more signs, producing the plurality of potential sign sequences, parsing the potential sign sequences, and generating output utterances in the target language.

* * * * *